United States Patent
Pliner et al.

(10) Patent No.: US 6,528,214 B1
(45) Date of Patent: Mar. 4, 2003

(54) CERAMIC MEMBRANE

(75) Inventors: Sergei Yuryevich Pliner, Ekaterinburg (RU); Viktor Georgievich Peichev, Ekaterinburg (RU); Nougzar Djeiranishvili, Moscow (RU)

(73) Assignee: Sterilox Medical (Europe) Limited, Oxfordshire (GB)

( * ) Notice: Subject to any disclaimer, the term of this patent is extended or adjusted under 35 U.S.C. 154(b) by 0 days.

(21) Appl. No.: 09/599,634

(22) Filed: Jun. 22, 2000

(30) Foreign Application Priority Data

Jun. 22, 1999 (GB) .............................. 9914396

(51) Int. Cl.⁷ ........................... H01M 2/14; H01M 2/16
(52) U.S. Cl. ........................................ 429/247; 429/251
(58) Field of Search .......................... 429/30, 31, 304, 429/305, 251, 247; 264/42, 43, 44

(56) References Cited

U.S. PATENT DOCUMENTS

| | | | |
|---|---|---|---|
| 4,957,673 A | * 9/1990 | Schroeder et al. | 264/109 |
| 5,106,502 A | 4/1992 | Goldsmith | |
| 5,762,841 A | * 6/1998 | Shimai et al. | 264/44 |
| 6,225,246 B1 | * 5/2001 | Darcovich | 210/500.21 |

FOREIGN PATENT DOCUMENTS

| | | |
|---|---|---|
| EP | 0 426 546 A2 | 5/1991 |
| EP | 0 619 379 A1 | 10/1994 |
| FR | 2 587 026 A1 | 3/1987 |
| GB | 1 251 656 | 10/1971 |
| GB | 2 253 860 B | 10/1995 |
| WO | WO 88/02742 | 4/1988 |
| WO | WO 90/15661 A1 | 12/1990 |

OTHER PUBLICATIONS

United Kingdom Search Report, Nov. 3, 1999, 1 page. Application No. GB 9914396.8.

* cited by examiner

*Primary Examiner*—Carol Chaney
(74) *Attorney, Agent, or Firm*—Akin Gump Strauss Hauer & Feld, L.L.P.

(57) ABSTRACT

A method of manufacturing a semi-permeable ceramic membrane and a semi-permeable ceramic membrane made by the method, the method including providing a mixture of at least two non-metallic mineral components comprising fine particles having an effective particle size of up to 1 $\mu$m and coarse particles having an effective particle size of 1 $\mu$m or above, the fine particles having a higher coefficient of thermal expansion than the coarse particles, suspending the mixture of fine and coarse particles in a liquid to form a slurry, applying the slurry to a porous mould so as to form a green intermediate product, and baking or firing the green intermediate product to form a finished membrane. The finished membrane has a density distribution of the fine particles that increases in one direction (in use) across the finished membrane and a density distribution of the coarse particles that decreases in the same direction across the finished membrane.

9 Claims, 1 Drawing Sheet

CERAMIC MEMBRANE

BACKGROUND OF THE INVENTION

The present invention relates to industrial ceramics and more particularly but not exclusively to semi-permeable acid-resistant and alkali-resistant ceramic membranes for use in electrochemical processing of liquids or filtration of liquids and gases.

It is known, for example from the specification of WO 88/02742, to manufacture a ceramic membrane by impregnating a porous ceramic article with a suspension of submicron particles and by baking the impregnated article. A membrane manufactured by this method takes the form of a two-layered wall consisting of a macroporous layer and a thin (less than 0.1 mm) microporous layer, through which the actual filtration takes place. The thin microporous layer is formed by coalescence of the submicron particles in the suspension on the macroporous ceramic article during baking. The rest of the macroporous ceramic article acts mainly as a supporting structure.

One disadvantage of this method is that, after baking, mechanical stresses arise at the boundary between the micro- and macroporous layers owing to additional shrinkage of the microporous layer. Consequently, cracks appear in the microporous layer which sharply reduce the effectiveness of filtration. Furthermore, a significant number of the large pores in the macroporous layer are not filled during impregnation because small bubbles of air are tapped inside them.

However, the main disadvantage is the low strength of the membrane made by this method, which makes the membrane unsuitable for use in electrochemical processes using electrochemical cell such as those described in GB 2253860. This is especially the case when the electrochemical processes are intensified, for example when electrodes are brought closer together and the pressure difference across the membrane is increased.

FR 2587026 describes an alternative method for manufacturing a microporous ceramic membrane that involves moulding an article from a two-component mixture, containing 10–40% by mass of fine particles and 90–60% by mass of coarse particles, followed by baking the article. Membranes produced by this method are moulded by extrusion or by casting from thermoplastic compounds. This gives the ceramics membrane a high degree of homogeneity because the fine particles are evenly distributed among the large particles, while the pores take the form of a ramified network of submicron channels between the particles.

However, this method of manufacturing microporous ceramic membranes still does not make it possible to form a microporous ceramic membrane which simultaneously has high mechanical strength and low hydraulic resistance. The even distribution of the fine particles around the coarse particles leads to the particles being closely packed and to low porosity of the membrane even at the moulding stage (25%). Furthermore, during subsequent baking, when shrinkage of the article by 3–5% is vital in order to achieve a ceramic membrane of sufficient strength, there is a fall in porosity of up to 10–20%. The resulting low porosity of the membrane does not allow it to be used, for example in electrochemical cells in which electrochemical processes are intensified. Also, decreasing the thickness of the membrane in order to reduce the effect of the low porosity is impractical because it causes a reduction in structural strength with consequential breaking of the membrane by the hydraulic pressure of the liquid being processed.

EP 0 619 379 discloses a method of manufacturing a functionally gradient material by cast forming a slurry of non-metallic particles and metallic particles having about five times the specific gravity of the non-metallic particles in a porous mould. The porous mould is rotated using rollers and the cast product is sintered to form non-porous articles such as sealing caps for bulbs of metal vapour discharge lamps which are, by their very nature, impermeable. This method is not suitable for manufacturing semi-permeable ceramic membranes for use in electrochemical processing of liquids or filtration of liquids and gases.

EP 0 426 546 relates to a ceramic filter comprising a porous ceramic support having a thin film layer comprising particles of small diameter. It is concerned with the problem of excessively small film thicknesses causing the support to be partially uncovered or resulting in an excessively great difference in particle diameter between particles of the thin film and the particles of the support that tends cause peeling or cracking. The problem is solved by having a fine intermediate layer of particles with a particle size of not more than 500 Å and a thin film formed on the surface of the fine intermediate layer of particles with a particle size of not more than 300 Å. This provides a ceramic filter of good permeability and improved durability. Sols are used for the formation of the fine intermediate layer and film and are applied to the support after the addition of a thickening agent to each sol in order easily to control the thicknesses of the films to be and prevent cracks or peeling when the sol is formed into a gel or a coating is dried.

Taking the drawbacks of the prior art into consideration, Applicant has sought to solve the problem of reducing hydraulic resistance of a ceramic membrane while, at the same time, increasing the load capacity (mechanical strength) of the membrane.

Accordingly, the main object of the present invention is to provide a microporous ceramic membrane of which the hydraulic resistance is reduced without compromising its load capacity (mechanical strength).

SUMMARY OF THE INVENTION

To this end, the present invention resides in a method of manufacturing a semi-permeable ceramic membrane, comprising providing a mixture of at least two non-metallic mineral components comprising fine particles having an effective particle size of up to 1 $\mu$m and coarse particles having an effective particle size of 1 $\mu$m or above, the fine particles having a higher coefficient of thermal expansion than the coarse particles, suspending the mixture of fine and coarse particles in a liquid to form a slurry, applying the slurry to a porous mould so as to form a green intermediate product and baking or firing the green intermediate product to form a finished membrane having a density distribution of the fine particles that increases in one direction (in use) across the finished membrane and a density distribution of the coarse particles that decreases in the same direction across the finished membrane.

Expressed in another way, the density and porosity of the ceramic of the membrane are uniformly decreased across the membrane, during casting.

By means of the present invention, the hydraulic resistance of the wall of the ceramic membrane is reduced and, simultaneously, the load capacity (mechanical strength) of the membrane is increased. Moreover, the invention is particularly suitable for the production of membranes of tubular, for example cylindrical, shape having an internal and an external surface made using a tubular porous mould or form for use in electrochemical cells.

Applying a slurry to a porous mould made, for example of plaster of Paris (gypsum), is known as slip casting which is in widespread use as a ceramic process because of its industrial applicability and ability to form an infinite variety of shapes. The slurry or "slip" conventionally includes special additives to impart certain desirable characteristics. For example, sodium silicate may be added to keep the slip liquified with minimal water content so that, when the slip is stirred, it is thinned down sufficiently, i.e. has sufficient fluidity and low viscosity, to enable it to be poured and flow easily into the porous mould. The slip is delivered continuously into the porous mould to replenish the absorbed water and the membrane builds up as a soft, semi-rigid "green" intermediate solid product on the inner wall of the mould by absorption of some of the liquid from the slip into the mould.

The green intermediate product is then baked or fired. Firing is carried out by heating in a controlled environment to impart hardness and strength to the finished ceramic membrane. Firing at an elevated temperature is similar to sintering in powder metallurgy. Conventionally, sintering results in the development of a strong bond between the particles but unfortunately, in so far as ceramic membranes for use in electrochemical cells are concerned, results also in reduced porosity which is one of the disadvantages of the prior art processes referred to above.

Applicant has discovered a principle which is that large fractions (coarse particles) and small fractions (fine particles) of a slip in a slip-casting process have differing settling rates. During casting, as the green intermediate product is built up on the surface of the porous form, stratification of the slip occurs, such that, the further away from the surface of the form, the lesser the content (concentration) of the coarse particles and the greater the content (concentration) of the sub-micron fine particles. When the article is baked or fired, this stratification (non-uniformity) is retained.

Consequently, the zone which is remote from the form, with its higher content of fine sub-micron particles and having a higher co-efficient of thermal expansion and that presents one surface, in use, of the finished ceramic membrane, is subjected to a reduction in its dimensions by a somewhat larger magnitude than the zone which is adjacent to the form, with its higher content of coarse particles that presents an oppositely facing surface, in use, of the finished ceramic membrane. In other words, the remote zone reduces its size during cooling by a slightly larger amount than the adjacent zone. As a result, the surface presented by the zone having a higher content of coarse particle of the finished ceramic product is in a state of compression, thereby increasing the strength of the finished membrane when above-atmospheric hydraulic fluid pressure is applied to the surface presented by the zone having a higher content of fine particles of the finished membrane by the liquid being processed. The increase in strength of the finished membrane is significant and therefore provides the requisite resistance against high fluid pressures.

Applicant believes that other researchers studying the process of slip casting using multi-component slips have previously considered stratification of the slip to be an adverse phenomenon. Consequently, they have tried to avoid such a formation by raising the volumetric proportion of the solid phase of the slip and/or by accelerating the build-up of the green intermediate product.

By way of the invention, even when a ceramic membrane wall is slowly built up from diluted slip to produce a membrane having a very thin wall thickness, it is possible to create a membrane in which the content of the small particles varies from 1.5 to 2 times from one surface of the membrane to the other. Consequently, the porosity of the membrane is also varied. Indeed, only an insignificant part of the membrane, where the particles are packed very densely, has a high density and a correspondingly high hydraulic resistance. In fact, it is this layer, that constitutes 20–30% of the membrane thickness, that possesses an hydraulic resistance and thickness that is equal to the resistance of a finished product made by methods described in the prior art, while the remainder of the membrane has a low hydraulic resistance and a high strength. Overall, however, the ceramic membrane made by the method of the present invention has a low hydraulic resistance and a high strength which makes the membrane reliable for use in electrochemical processes involving high pressures, Preferably, the relative proportions by mass of the particles in the mineral mixture of the slip are 10–40% fine particles and 90–60% coarse particles. The fine and coarse particles may be of any appropriate kind but Applicant has found that particles selected from the group comprising: alumina, alumina-magnesian spinels, mullite and zirconium dioxide are particularly effective.

The effect of size stratification of the particles is especially seen when the slip has a moisture content in excess of approximately 40% and a rate of green intermediate product build-up of less than 0.7 mm/min. When the moisture content increases to 50%, the rate of build-up of green intermediate product falls to 0.3 mm/min, while a further increase in slip moisture content gives a still greater decrease in the rate of green intermediate product build-up, and a still greater degree of particle stratification.

At a green intermediate product build-up rate of below 0.05 mm/min (slip moisture content approximately 85%), slip stratification is seen over the thickness of the green intermediate product during creation of the membrane (approximately 10 minutes), which makes for a significant variation in thickness.

For slip mixtures with a difference in thermal expansion coefficient between the inner (fine particle) and outer (coarse particle) zones of more than $2\times10^{-6}$/K and a slip moisture content of approximately 90%, the particle stratification is so pronounced that cracks are formed on the inner surface of the membrane. A 55% to 75% moisture content is optimal for the manufacture of membranes with a high mechanical strength and low hydraulic resistance. At the same time, when the slip moisture content rises too high, the mechanical strength falls steeply. So, Applicant believes that a moisture content of approximately 60% is optimal for the production of membranes suitable for use in electrochemical processes carried out under high pressure.

It is possible to vary the density and porosity of the membrane wall by controlling the liquid content and viscosity of the slip, by introducing surfactants, and by varying the pH of the slip. Another important parameter is the porosity and pore size of the mould into which the slip is cast. These parameters are set depending on the proportions and nature of the particles in the slip, taking into account differences in density, fineness, thermal expansion, and even the shape of the non-metallic mineral particles. In general, the parameters may be determined experimentally, taking into account the actual conditions under which the membranes will operate.

The invention also comprehends an electrochemical cell having an anode chamber and a cathode chamber which are separated from each other by any of the ceramic membranes as defined hereinabove and made in accordance with the present invention.

BRIEF DESCRIPTION OF THE SEVERAL VIEWS OF THE DRAWING

In order that the present invention may be more readily understood, reference shall now be made, by way of example to the accompanying drawing, which is a graph of membrane characterstics dependent upon slip composition, and to the Table which summarises the following data.

DETAILED DESCRIPTION OF THE INVENTION

Figure 1:
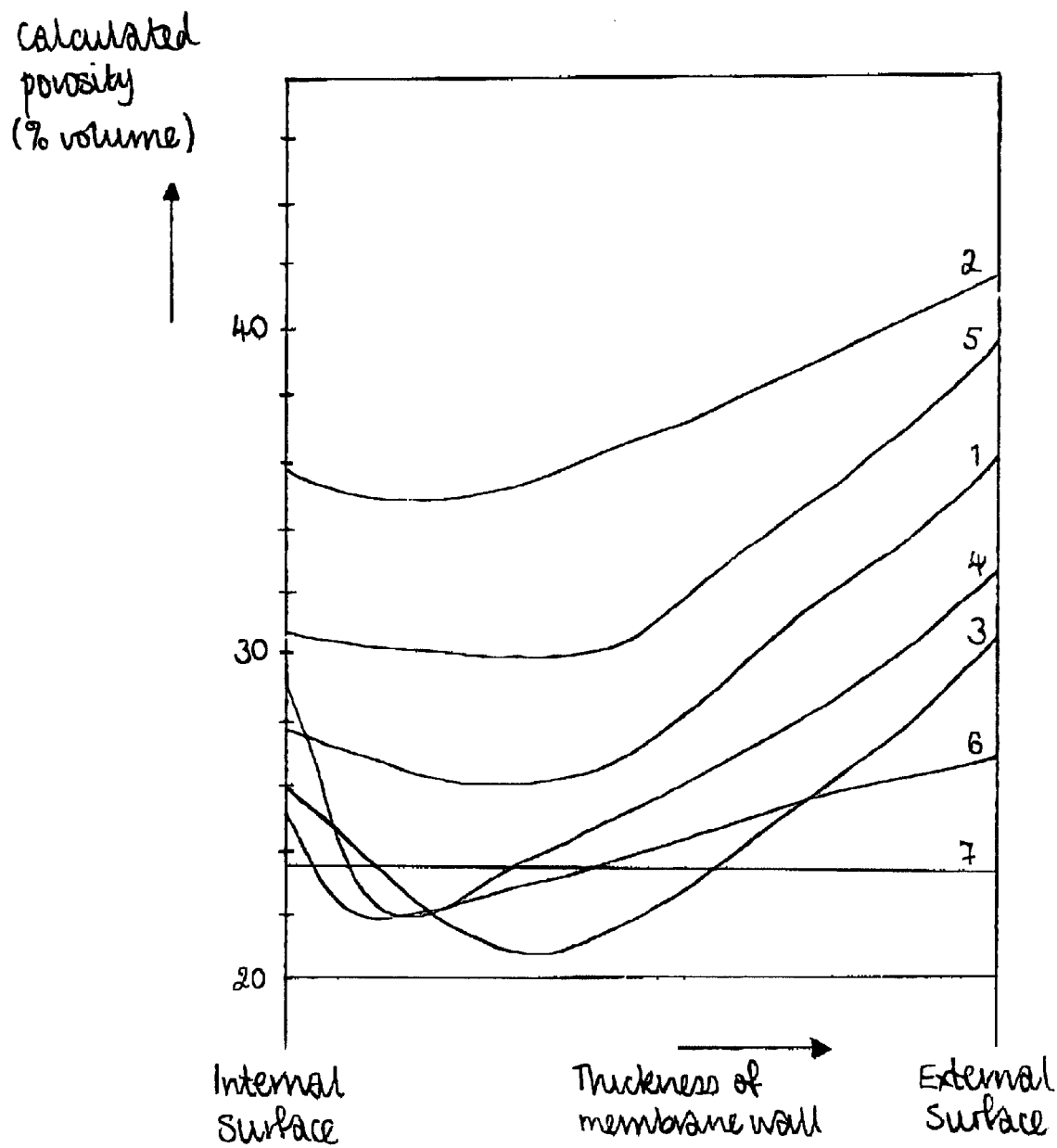

Ceramic membranes in the form of tubes with an external diameter 11.5 mm, length 210 mm and wall thickness 0.5 mm were formed by slip casting in gypsum/plaster moulds using slips with a 60% moisture content comprising alumina, zirconium dioxide (yttrium oxide stabilised 7% by mass), alumino-magnesian spinel, and mullite. The green intermediate products were baked at temperatures from 1200 to 1400° C. thereby ensuing shrinkage of slip-cast membranes by 3–5%.

Strength of the membranes was determined by increasing water pressure inside the membranes until destruction of the membranes occurred. Hydrodynamic resistance was determined by seepage of water through the membrane at a temperature of 25° C. and a water pressure inside the membrane of 0.15 MPa. The approximate porosity of the membranes across their sections was determined by calculation using photomicrographs of polished end faces of the membranes.

It will be seen from the data in the table that, in comparison with the prior art (Example 7), semi-permeable ceramic membranes manufactured by way of the present invention (Examples 3, 4 and 6) have greater mechanical strength and greater water permeability, i.e. a lower hydraulic resistance. When the components of the slip have equal thermal expansion coefficients (as illustrated in Examples 1 and 5), or if the relatively large particle component has a greater coefficient of thermal expansion (Example 2), the membranes, in spite of their low hydraulic resistance, do not have sufficient strength to operate in high-efficiency electrochemical equipment where the membrane may be subjected to high pressures.

TABLE

CHACTERISTICS OF CERAMIC MEMBRANES

| Example | Composition of slips (solids) | Destructive pressure difference (MPa) | Permeability with regard to water at 25° C. (ml/hour · m² · Pa) |
|---|---|---|---|
| 1 | Alumina 3–5 µm 70% by mass Alumina 0.8–1.0 µm | 0.34 | 1.4 |
| 2 | Alumina-magnesian spinel 4–10 µm 80% by mass Alumina 0.8—1.0 µm 20% by mass | 0.19 | 1.3 |
| 3 | Mullite 3–10 µm 75% by mass Alumina 0.8–1.0 µm | 0.39 | 0.9 |
| 4 | Alumina 3–5 µm 80% by mass Zirconium dioxide 0.3–0.8 µm 20% by mass | 0.61 | 1.4 |
| 5 | Alumino-magnesian spinel 4–10 µm 80% by mass Zirconium dioxide 0.3–0.8 µm 20% by mass | 0.22 | 1.6 |
| 6 | Mullite 3–10 µm 85% by mass Zirconium dioxide 0.3–0.8 µm 15% by mass | 0.72 | 1.5 |
| 7 | Alumina 3–5 µm 80% by mass Zirconium dioxide 0.3–0.8 µm 20% by mass | 0.25 | 0.4 |

The membranes of examples 1 to 6 were formed by a slip casting process, whereas the membrane of example 7 was formed by extrusion in accordance with the disclosure of FR 2587026.

We claim:

1. A method of manufacturing a semi-permeable ceramic membrane for use in an electrochemical cell having an anode chamber and a cathode chamber which are separated from each other by the membrane, the method comprising:

providing a mixture of at least two non-metallic mineral components comprising fine particles having an effective particle size of up to 1 µm and coarse particles having an effective particle size of above 1 µm, respectively, the fine particles having a higher coefficient of thermal expansion than the coarse particles;

suspending the mixture of fine and coarse particles in a liquid to form a slurry;

applying the slurry to a porous mold so as to form a green intermediate product on a surface of the porous mold in which stratification occurs as the green intermediate product is being built up such that the further away from the surface of the porous mold the lesser the content of the coarse particles and the greater the content of sub-micron fine particles;

baking or firing the green intermediate product; and allowing the baked or fired product to cool to form a finished ceramic membrane having a density distribution of the fine particles that increases in one direction, in use, across the finished ceramic membrane and a density distribution of the coarse particles that decreases in the same direction across the finished ceramic membrane and in which the stratification is retained so that a zone that is remote from the porous mold and has a higher content of sub-micron fine particles and a higher co-efficient of thermal expansion comprises one surface of the finished ceramic membrane, in use, and is subjected to a reduction in its dimensions by a larger magnitude during cooling than a zone which is adjacent the porous mold and having a higher content of coarse particles which, in use, comprises an oppositely facing surface of the finished ceramic membrane and which is in a state of compression.

2. The method according to claim 1, wherein the composition by mass of the mineral mixture of the slurry is 10–40% fine particles to 90–60% coarse particles.

3. The method according to claim 1, wherein the slurry has a moisture content of 55% to 75%.

4. The method according to claim 3, wherein the slurry has a moisture content of about 60%.

5. The method according to claim 1, wherein the particles are selected from a group comprising alumina, alumina-magnesian spinels, mullite and zirconium dioxide.

6. A semi-permeable ceramic membrane produced by the method of claim 1.

7. The membrane according to claim 6, wherein the composition by mass of the mineral mixture is 10–40% fine particles to 90–60% coarse particles.

8. The membrane according to claim 7, wherein the particles are selected from the group comprising alumina, alumina-magnesian spinels, mullite and zirconium dioxide.

9. An electrochemical cell having an anode chamber and a cathode chamber which are separated from each other by the semi-permeable ceramic membrane according to claim 6.

* * * * *